(12) United States Patent
Du et al.

(10) Patent No.: US 7,337,222 B1
(45) Date of Patent: *Feb. 26, 2008

(54) SYSTEM AND METHOD FOR SUPPRESSING OUT-OF-ORDER SIDE-EFFECT ALARMS IN HETEROGENOEUS INTEGRATED WIDE AREA DATA AND TELECOMMUNICATION NETWORKS

(75) Inventors: Weimin Du, San Jose, CA (US); Anisur Rahman, San Jose, CA (US); Raja Banerjee, Cupertino, CA (US); Sunil Gharat, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 743 days.

This patent is subject to a terminal disclaimer.

(21) Appl. No.: 10/741,682

(22) Filed: Dec. 19, 2003

Related U.S. Application Data

(63) Continuation of application No. 09/595,312, filed on Jun. 16, 2000, now Pat. No. 6,694,364.

(51) Int. Cl.
G06F 15/173 (2006.01)
G06F 11/00 (2006.01)
(52) U.S. Cl. .................... 709/223; 709/224; 714/4; 714/47; 714/48
(58) Field of Classification Search .............. 709/223, 709/224; 715/734–736; 714/4, 47–48
See application file for complete search history.

(56) References Cited

U.S. PATENT DOCUMENTS 5,408,218 A * 4/1995 Svedberg et al. ........... 340/507

| 5,636,204 | A | 6/1997 | Mizuno et al. |
| 5,636,206 | A | 6/1997 | Amemiya et al. |
| 5,768,501 | A | 6/1998 | Lewis |

(Continued)

FOREIGN PATENT DOCUMENTS

EP        0909056 A2    4/1999

OTHER PUBLICATIONS

Jakoson et al. "Alarm Correlation- Correlating multiple network alarms improves"; IEEE network, Nov. 1993.*

(Continued)

*Primary Examiner*—Jason Cardone
*Assistant Examiner*—Lin Liu
(74) *Attorney, Agent, or Firm*—Hickman Palermo Truong & Becker LLP

(57) ABSTRACT

A method of suppressing a side-effect alarm in a network management system that includes a plurality of managed network elements, wherein the side-effect alarm arrives at the network management system before a triggering alarm, the method comprising the steps of creating and storing state information for each of the managed network elements, wherein the state information comprises a current connection state value and a parent state value; receiving segment alarm information that identifies a first arriving alarm relating to a segment of the connection; determining a new connection state value to which the connection transitions as a result of the segment alarm identified in the segment alarm information and based on the current connection state value; selectively suppressing or forwarding an alarm reflecting the new connection state value based on the parent state value, a self state transition value, and a secondary state transition value.

35 Claims, 7 Drawing Sheets

U.S. PATENT DOCUMENTS

| | | | |
|---|---|---|---|
| 5,771,274 A | | 6/1998 | Harris |
| 5,922,051 A | * | 7/1999 | Sidey .......................... 709/223 |
| 6,052,722 A | * | 4/2000 | Taghadoss .................. 709/223 |
| 6,124,790 A | | 9/2000 | Golov et al. |
| 6,154,129 A | * | 11/2000 | Kajitani et al. ............. 340/506 |
| 6,173,324 B1 | * | 1/2001 | D'Souza ..................... 709/224 |
| 6,205,563 B1 | | 3/2001 | Lewis |
| 6,243,746 B1 | * | 6/2001 | Sondur et al. .............. 709/220 |
| 6,253,339 B1 | | 6/2001 | Tse et al. |
| 6,271,845 B1 | * | 8/2001 | Richardson ................. 715/764 |
| 6,300,966 B1 | * | 10/2001 | Gregory et al. ............. 715/736 |
| 6,349,333 B1 | * | 2/2002 | Panikatt et al. ............. 709/223 |
| 6,356,885 B2 | | 3/2002 | Ross et al. |
| 6,456,306 B1 | * | 9/2002 | Chin et al. .................. 715/810 |
| 6,601,185 B1 | | 7/2003 | Bass et al. |
| 6,732,153 B1 | * | 5/2004 | Jakobson et al. ........... 709/206 |
| 2003/0005021 A1 | | 1/2003 | Shah et al. |
| 2004/0030778 A1 | * | 2/2004 | Kronenberg et al. ........ 709/224 |

OTHER PUBLICATIONS

Du, W., et al., Practical Alarm Suppression of End-to-End Virtual Circuit Connections, www.dvo.ru/bbc/pdpta/vol1/ps1261.pdf, pp. 1-7, Jun. 27, 2000.

3rd Generation Partnership Project: Technical Specification Group Services and System Aspects; 3G Fault Management (Release 1999), 3G TS 32.11 v3.0.1, 3rd Generation Partnership Project, pp. 1-20, Mar. 2000.

PDPTA 2000 Conference Program, www.ashland.edu/-iajwa/conferences/2000/Schedules/pdpta.txt, pp. 1-45, date unknown.

U.S. Appl. No. 10/291,118, filed Nov. 7, 2002, Office Action Mailing Date Apr. 18, 2007.

* cited by examiner

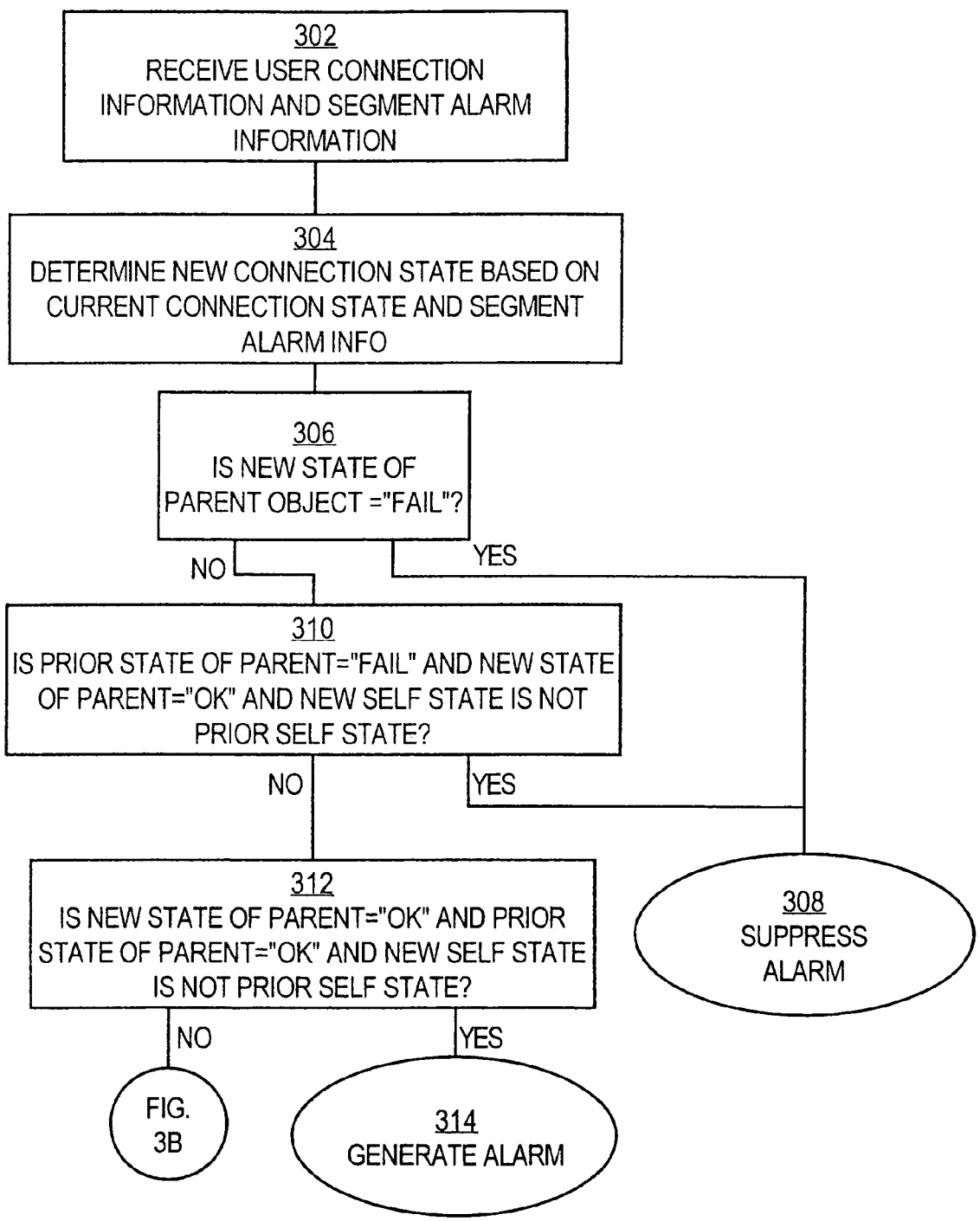

SYSTEM AND METHOD FOR SUPPRESSING OUT-OF-ORDER SIDE-EFFECT ALARMS IN HETEROGENOEUS INTEGRATED WIDE AREA DATA AND TELECOMMUNICATION NETWORKS

CROSS-REFERENCE TO RELATED APPLICATIONS; PRIORITY CLAIM

This application claims domestic priority under 35 U.S.C. 120 as a Continuation of prior application Ser. No. 09/595,312, filed Jun. 16, 2000 now U.S. Pat. No. 6,694,364, the entire contents of which are hereby incorporated by reference as if fully set forth herein.

FIELD OF THE INVENTION

The present invention generally relates to data processing in the field of networking. The invention relates more specifically to suppressing dependent alarms that are caused by other alarms using software event processing in a distributed network management system.

BACKGROUND OF THE INVENTION

Network management systems are now in wide use for the purpose of facilitating administration, configuration, and monitoring of complex local area networks, wide area networks, campus networks, etc. An example of a commercially available network management system is Cisco WAN Manager, available from Cisco Systems, Inc., San Jose, Calif.

Some network management systems are implemented using object-oriented computer programming development environments. In these systems, it is convenient to represent physical elements of a real-world network, such as routers, switches, and their components, in terms of programmatic objects and instances of the objects. Cisco WAN Manager, for example, uses a set of managed objects and a set of events generated by the managed objects.

A managed object is a resource within a system that may be managed through the use of some management protocols. For example, in a telecommunication network, switches (or nodes), cards, and ports can be managed using the SNMP protocol and may be represented by objects that are instantiated by the network management system. Managed objects may comprise physical managed objects or logical managed objects. Physical managed objects are resources that are defined by physical hardware components. Examples of physical managed objects that are useful in representing a telecommunication network include nodes, cards, ports, and trunks. Logical managed objects, in contrast, are supported by one or more hardware components. Examples of logical managed objects include end-to-end user connections, and endpoints of user connections.

Physical managed objects may be related to each other using one or more object containment relationships. Managed object instances that contain other managed objects are called composite managed objects. Typically, managed objects are created and stored in a structure that has a directed acyclic graph topology. For example, a node object contains all cards of that node, a card contains all ports on the card, etc.

Logical managed objects may be related to each other using an association relationship. A logical managed object instance is associated with another if the object instances, and possibly other logical managed objects, make up a higher level logical managed object. For example, one endpoint is associated with another endpoint if they are endpoints of the same user connections.

A user connection or segment may also be associated with another if they form a larger user connection.

A logical managed object may also be contained by physical managed objects or other logical managed objects. For example, a port (a physical managed object) contains all endpoints on the port. A user connection is contained by its endpoints. Note the difference of containment relationship between logical managed objects and physical managed objects. A physical managed object contains other physical managed objects if it is composed of those physical managed objects. A logical managed object, on the other hand, is contained by other logical managed objects if it is composed of those logical managed objects. A logical managed object is contained by a physical managed object if it is supported by the physical managed object.

Events indicate the occurrence of a monitored condition of managed objects. Events of physical managed objects are generated by physical managed objects, while events of logical managed objects are generated or derived by the management system. An event on a physical managed object may affect both the physical managed object and some logical managed objects. For example, a port failure event will affect both the physical managed object (the port) and logical managed objects (endpoints on the ports and corresponding connections).

Events have various relationships to one another. Time is one relation: event A happens before event B. Cause is another relation: event A caused event B to happen. If event A caused event B to happen, then event A must have happened before event B. In general, an event on a managed object may cause events on other managed objects contained by it to happen. For example, a failure event on a port will result in a failure event on all endpoints on the port, and subsequently, result in failure events on user connections contained by the endpoints.

The state of a managed object comprises self, secondary, and parent states. The parent state is for all managed objects and is defined as the (self) state summary of all containing managed objects. Thus, for logical managed objects, the fail parent state always implies the fail self state.

The self state of a physical managed object is defined as the condition of the hardware component, while the self state of a logical managed object is fail if any physical managed objects that support the logical managed object is in fail self state. A logical managed object may also be in fail state for its own reasons. For example, a user connection will be in fail state if it is not configured properly, even if all supporting (or containing) physical managed objects are in OK state.

The secondary state is only for logical managed objects and is defined as the self state summary of all associated logical managed objects.

Event processing is useful in management of a data and telecommunication network that uses the foregoing object model. A data and telecommunication network is a geographically distributed collection of interconnected subnetworks for transporting data between stations. An end-to-end user connection consists of segments from the subnetworks. A user connection state is defined as aggregation of those of its component segments. Network management in such a system is hierarchical; each subnetwork is managed independently by separate network management system, responsible for segments in the subnetwork. There is a global network management system responsible for user connections across subnetworks.

In the above-described model, network elements are physical managed objects managed by element managers, while segments are logical managed objects managed by connection managers. Network elements generate events (or alarms) when monitored conditions occur. One task of element managers is to report alarms on network elements to the connection manager when segments are affected. Similarly, a connection manager in each subnetwork is responsible for generating (and reporting) alarms for segments contained by the network elements to the global connection manager (when user connections are affected). The global connection manager will then decide if and how to report the alarms to an end user of the network management system.

Event processing, or more specifically alarm suppressing, is an important issue in data and telecommunication network management. Distributed systems in enterprises as well as telecommunication environments demand more automated fault management. A single fault at element level in these complex systems might cause a huge number of symptomatic error messages and side effects to occur at all levels. The common root faults for these symptoms have to be identified to start fault removal procedures as soon as possible and to decrease system down-time.

In particular, when one or more network elements fail and the failure is later cleared, users who monitor the network should be informed about network state change by means of an alarm. Often, when a network element fails, a large number of network alarms will be generated from all affected network elements and connection segments. Event correlation is a technique that correlates a large number of network alarms into a small number of root cause alarms.

In large data and telecommunication network that interconnects multiple subnetworks, there is also a need for event correlation at the global network level, in addition to event correlation at the subnetwork level. For example, a port failure at one subnetwork may be detected by another subnetwork. One subnetwork reports to the global network management system a port failure affecting a number of segments, and the other subnetwork reports a secondary or A-bit failure, affecting a different set of segments. The global network management system is responsible to correlate the two alarms, and in this case suppress the A-bit alarm, as it is caused by port failure at other subnetwork.

Alarm correlation is the process by which several alarms are narrowed from a mass of problems to a root cause to report and side effects to suppress. Alarm suppressing can be local to a subnetwork or cross subnetwork boundaries. For example, the port failure at element level in a subnetwork may be detected by other subnetworks: one subnetwork reporting a port failure affecting a set of segments, and other subnetworks reporting so called A-bit failures affecting different sets of segments. It is the network management system's responsibility to correlate these alarms, and in this case suppress A-bit alarms, as they are caused by port failure at other subnetwork.

Different approaches to this problem have been proposed. Various approaches are based on state machines, rule processing, and codebooks. A number of commercial systems are also available based on the technology, e.g., the Event Correlation Service of Hewlett-Packard OpenView, Event Correlation Solutions offered by Lucent Technologies, Inc., NerveCenter from Seagage, and InCharge from SMARTS. Further information about these systems is set forth in Kent Sheers, HP OpenView Event Correlation Services, Hewlett-Packard Journal, October 1996; Lucent Technologies, Event Correlation Solution, document 5683FS.pdf at the Lucent Web site; Seagate Corp., Enterprise Event Automation with Seagate NerveCenter, a white paper available from Seagate; Shaula Yemini, et al., High Speed and Robust Event Correlation, IEEE Communication Magazine, May 1996.

Techniques have been developed and widely used to correlate events at network element level. For example, when a line fails, all ports in the line also fail. But all network alarm events about port failure will be suppressed, as they are all caused by the line failure.

General event correlation techniques have also been developed that allow users to define their own event correlation login at a higher level, such as in the case of a subnetwork that is managed by a single network management system. An example of such an approach is the Hewlett-Packard OpenView Event Correlation Service. A general event correlation system can be used for event correlation at the global network management level.

Unfortunately, these systems have numerous drawbacks. For example, while they are powerful and are designed to handle all kinds of alarms at different levels of abstraction, they offer too much power and overhead for some management situations. They are complex and thus difficult to use, requiring significant customization, e.g., writing event correlation rules, building a behavior model for a state machine, or designing event models of managed objects. They are computationally expensive to use and incur significant runtime overhead. For example, to carry out rule evaluation or for minimal distance decoding, they must carry out database operations and/or complex rule evaluation at run time.

In other cases, an alarm may arrive but there may be insufficient information to determine whether it should be suppressed. In these cases, prior approaches may suppress the alarm anyway, even though later information may indicate that the alarm should not be suppressed.

Based on the foregoing, there is a clear need in this field for a simple and accurate alarm suppression method and system.

Further, there is a need for a method or system of alarm suppression that can determine when a particular alarm is likely to be a side-effect alarm, but that can suspend action on that alarm until receiving additional information that confirms that the alarm is a side-effect alarm that should be suppressed.

SUMMARY OF THE INVENTION

A method of suppressing a side-effect alarm in a network management system that includes a plurality of managed network elements, wherein the side-effect alarm arrives at the network management system before a triggering alarm, the method comprising the steps of creating and storing state information for each of the managed network elements, wherein the state information comprises a current connection state value and a parent state value; receiving segment alarm information that identifies a first arriving alarm relating to a segment of the connection; determining a new connection state value to which the connection transitions as a result of the segment alarm identified in the segment alarm information and based on the current connection state value; selectively suppressing or forwarding an alarm reflecting the new connection state value based on the parent state value, a self state transition value, and a secondary state transition value.

According to one embodiment, a method and apparatus are provided for suppressing side effect alarms in a network communication system that arrive out of order, based on state change and the alarm reporting history of logical managed objects, such as user connections, is disclosed. State information is maintained for each of a plurality of interested logical managed objects that represent user connections, comprising parent object state, primary state, and secondary state. The parent object state is OK if all parent objects (lines, ports, etc.) of the connection are functioning properly, and FAIL otherwise. The primary connection state is OK if the entire connection is functioning properly. The secondary state or A-bit state is FAIL if a failure at one subnetwork is detected by other subnetworks. The system also maintains information indicating the last generated alarm for each interested logical managed object. A new state of each interested logical managed object is computed when alarms on its containing physical managed objects or associating logical managed objects have been reported. The method then decides whether to report or suppress the alarms, based on a lookup operation using a decision table. If an alarm is suspected of being a side-effect alarm, based on selected conditions, alarm information is placed in a queue to await the arrival of a second, related alarm that confirms that the first alarm was a side-effect alarm, and the side-effect alarm is then suppressed.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3A is a flow diagram of an embodiment of a method of suppressing alarms.

DETAILED DESCRIPTION OF THE PREFERRED EMBODIMENT

Figure 1:
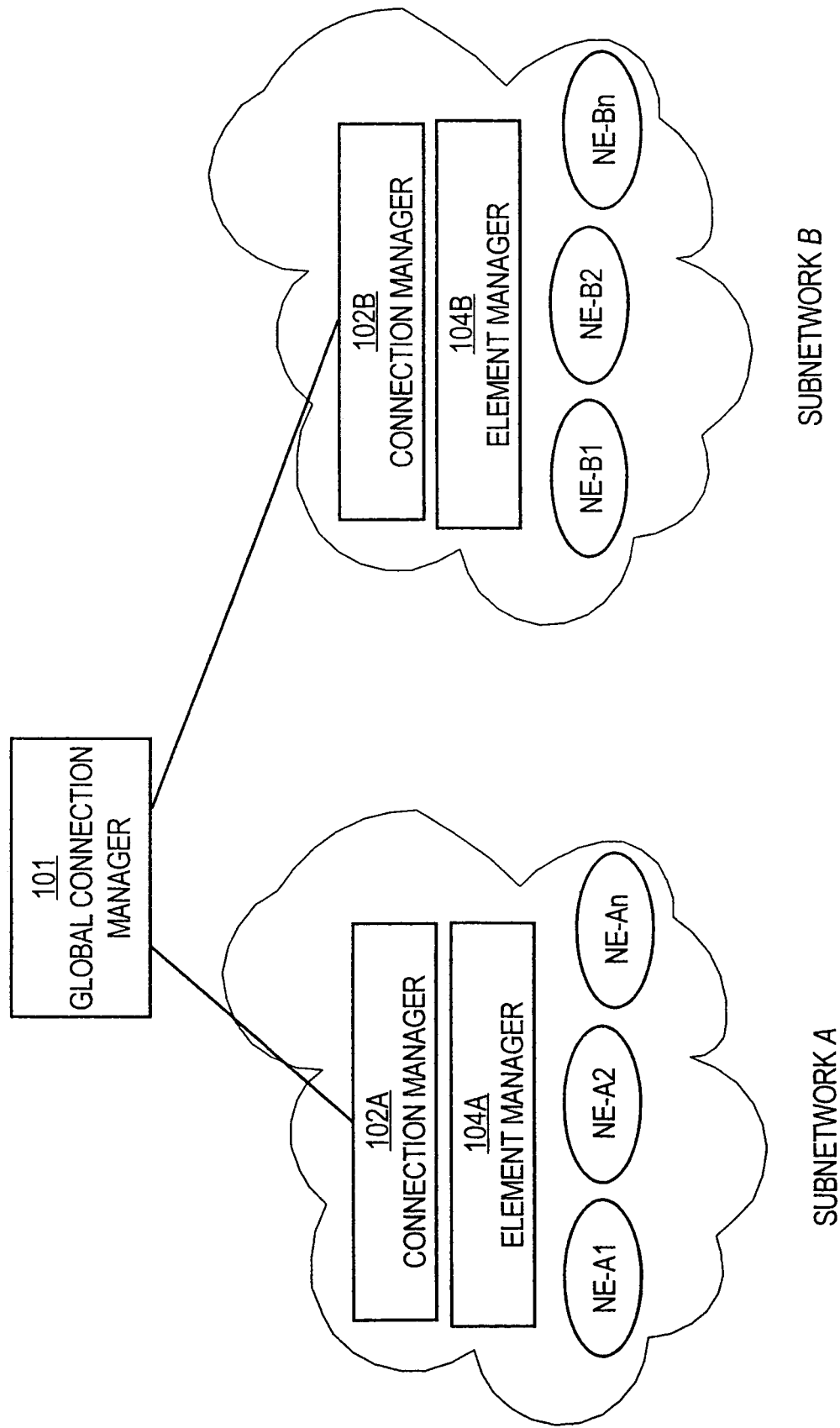
FIG. 1 is a simplified block diagram of a network management system.

A method and apparatus for suppressing side-effect alarms in network management systems is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Functional Overview

According to one embodiment, a method is provided that suppress unnecessary alarms caused by other root alarms, by using the containment and association relationships between managed objects. In one specific embodiment, alarms on a logical managed object are suppressed that is caused by one or more alarms on other managed objects that contain the logical managed object.

Embodiments are disclosed in the context of two-segment connections, however, the approaches herein can be applied to user connections composed of two or more segments. The presented mechanism has been found to reduce alarm generation by about 33% in a large production network. The method also can be used in environments comprising of multiple networks with different protocols over a public network-network interface or the Cisco auto-route interface.

In one embodiment, it is assumed that in a network management system, for example, A-bit and segment failure alarms detected by one subnetwork, may actually be caused by parent object failure at other subnetwork. Subnetworks report alarms on a segment that consist of current parent, primary and A-bit state and the global network management system decides if it is caused by parent object failure at other subnetwork and thus should be suppressed.

According to an embodiment, an alarm suppressing method based on 1-step state change and the alarm reporting history of logical managed objects, e.g., user connections, is disclosed. The system maintains state information for each of a plurality of interested logical managed objects, representing, e.g., user connections, comprising parent object state, primary state, and secondary state. The parent object state is OK if all parent objects (lines, ports, etc.) of the connection are functioning properly, and FAIL otherwise. The primary connection state is OK if the entire connection is functioning properly. The secondary state or A-bit state is FAIL if a failure at one subnetwork is detected by other subnetworks. The system also maintains information indicating the last generated alarm for each interested logical managed object, e.g., user connection.

According to an embodiment, a new state of each interested logical managed object is computed when alarms on its containing physical managed objects or associating logical managed objects have been reported. The method then decides whether to report or suppress the alarms, based on a lookup operation using a decision table.

Alarm suppressing may take place at different levels, e.g., network elements, segments, or user connections levels. Alarm suppressing can be simple and straightforward. The key is to suppress alarms at right places and at right levels. Alarm suppressing should be based on containment hierarchy and association of managed objects. In most cases, side effect alarms can be suppressed locally using simple database relationships, e.g., suppressing alarms on ports when the containing card failed. For cross network alarms (e.g., A-bit alarms caused by port failure in remote subnetwork), a global alarm suppressing algorithm is needed.

Operational Context

FIG. 1 is a simplified block diagram of a network management system as viewed from the perspective of alarm reporting on user connections.

A managed network comprises one or more subnetworks, which are designated Subnetwork A and Subnetwork B in FIG. 1. Each subnetwork consists of any number of network elements NE-A1, NE-A2, NE-An, NE-B1, NE-B2, NE-Bn, etc. Examples of network elements include nodes (e.g., Cisco MGX switches), cards, lines, and ports. Network elements form a containment hierarchy: nodes contain cards, cards contain lines and lines contain ports. Thus, the failure of a node also implies failures of all cards, lines, and ports contained in the node.

Each subnetwork has a connection manager 102A, 102B that manages connections, and an element manager 104A, 104B that manages connections. A global connection manager 101 manages all the connection managers 102A, 102B, 104A, 104B.

End stations in a network may be connected by connection segments. A connection segment ("segment") is a permanent virtual circuit that is established within a subnetwork between two end points with certain bandwidth, and that is capable of transporting data from one end point to the other. A segment is always contained by the ports of its end points. Multiple segments may share the same port.

Figure 2:
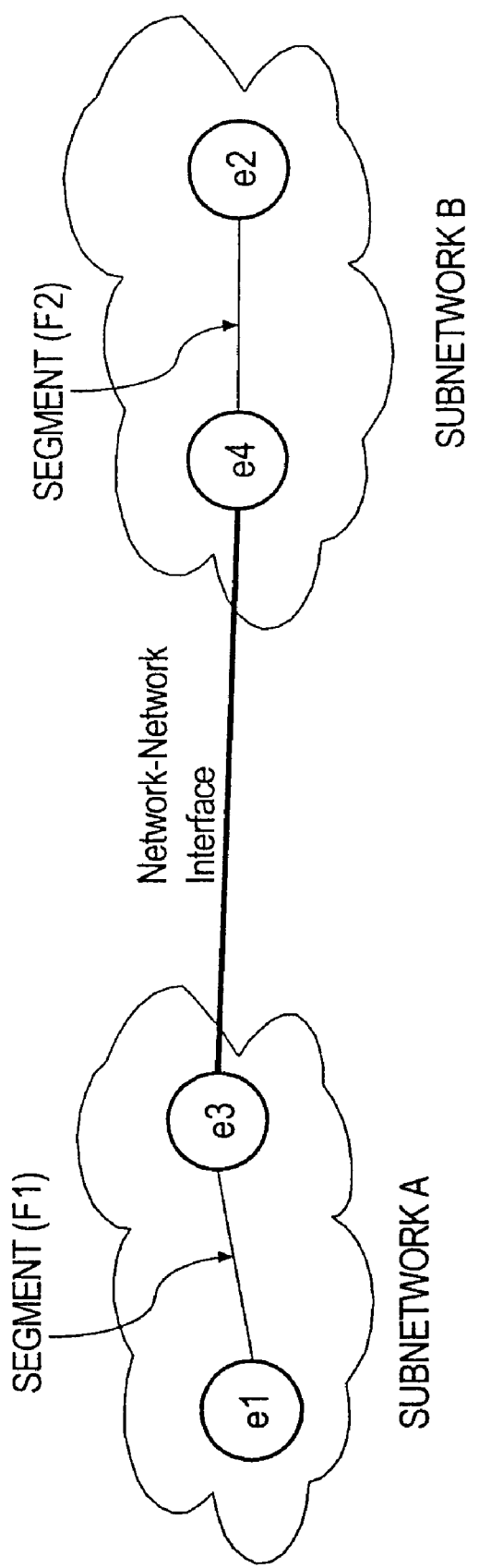
FIG. 2 is a simplified block diagram of a user connection in the network of FIG. 1.

A user connection is a permanent virtual circuit that may cross subnetwork boundaries. A user connection consists of one or more segments belonging to individual subnetworks. For example, as illustrated in FIG. 2, a user connection of network elements $e_1$-$e_2$ consists of two (2) segments. Segment $F_1$ connects elements $e_1$-$e_3$ in subnetwork A, and $F_2$ connects elements $e_4$-$e_2$ in subnetwork B. Segments $F_1$ and $F_2$ are connected by trunks using a network-network interface. The user connection has end points $e_1$ and $e_2$ that are normally connected to customer premises equipment.

Network elements are physical managed objects that are managed by the element managers 104A, 104B, while segments are logical managed objects that are managed by the connection managers 102A, 102B. Network elements may generate events (or alarms) when monitored conditions occur. One task of element managers 104A, 104B is to report alarms on network elements to their associated connection manager 102A, 102B when segments are affected. Similarly, connection managers 102A, 102B are responsible for generating and reporting alarms for segments contained by the network elements to the global connection manager 101, when user connections are affected. The global connection manager 101 then decides if and how to report the alarms to end users.

The state of a user connection segment is defined as the aggregation of its component segments, and as three (3) parts: self state, parent state, and secondary state. A self state is the primary state of the segment, and can be either OK or FAIL. A segment is in OK state if all the supporting hardware is functioning properly and it can transport data from one end point to the other successfully. Otherwise, the segment is in the FAIL self state.

The parent state is the summary state of all parent objects that contain the segment, and also can be either OK or FAIL. The parent state of a segment is in OK state if all its parent objects (e.g., ports, lines, cards, nodes) are in OK state, and in FAIL state otherwise. Thus, when the parent state is FAIL, then the self state of a segment is always FAIL, but the converse may not be true.

The secondary state includes other related alarm states that may affect the segment (directly or indirectly). For example, the A-bit state represents the state of associated segments or represents the state of customer premises equipment. Two (2) segments are associated with each other if they both participate in the same user connection. An A-bit FAIL alarm on a segment is generated if any of its associated segments or customer premises equipment is in FAIL state. A-bit alarms are reported at segment level, and not at higher levels. For the purpose of illustrating a representative example, in this document only A-bit secondary state is addressed, however, other secondary alarms can be similarly processed.

Thus, a user connection state is the aggregation of those of its component segments, and also consists of self state, parent state, and secondary state. A user connection is in FAIL self state if any of its member segments is in FAIL self state. The secondary state (e.g., A-Bit state) of a user connection is simply the summary of those of its member segments and may not have logical meaning to the user connection.

Alarm Suppressing Method

A method of alarm suppression in the context of a telecommunication network is now described. The method described herein may be applied in many other contexts, including any kind of event processing.

The description herein assumes that an alarm is generated for each parent object failure or segment failure. Higher-level object failures, such as a failure of a port, may also result in separate alarms on segments, such as an A-bit alarm. The description also assumes that for each FAIL alarm that is generated, a corresponding OK alarm is generated, so that the failure is eventually cleared.

According to an embodiment, an alarm on a user connection is suppressed if it is caused by failure of its parent objects. An alarm is also suppressed if it results in no change in self state or secondary state for the connection. Otherwise, the alarm is forwarded to the end user or to an external application. The connection manager 102A, 102B only forwards self state and secondary alarms to end users. Alarms on parent objects of connections are forwarded by another management module, such as element manager 104A, 104B, or some other element agent.

This description also assumes that different types of alarms are correlated and suppressed by different network management modules. For example, many switches are capable of suppressing alarms on lower level objects when caused by higher-level objects. As an example, the MGX series of switches that are commercially available from Cisco Systems, Inc. can suppress alarms on ports that are caused by cards. Similarly, many connection managers can suppress alarms on segments when higher-level objects cause the alarms.

However, this description does not assume that all network management modules of all subnetworks have alarm suppressing capability, except for the global connection manager. Thus, when a segment fails due to failures of its parent objects, connection managers 102A, 102B may receive both a parent FAIL alarm on the segment, as well as a self FAIL alarm caused by the parent alarm. The global connection manager 101 is expected to suppress the self FAIL alarm when this happens.

The global connection manager 101 also should be able to suppress segment alarms that cross subnetwork boundaries. For example, referring again to FIG. 2, suppose that the port at end point $e_3$ has failed. In response, connection manager 102A of subnetwork A will receive a parent FAIL alarm on $e_1$-$e_3$, which it will forward to the global connection manager 101. Further, connection manager 102B of subnetwork B will receive an A-bit alarm on $e_4$-$e_2$, which it will also forward to the global connection manager 101. Connection manager 102B of subnetwork B cannot suppress the A-bit alarm on $e_4$-$e_2$, because it is does not know of the existence of the failed port in subnetwork A. Accordingly, global connection manager 101 should correlate the two alarms and suppress the A-bit alarm on $e_4$-$e_2$.

According to an embodiment of the invention, alarms are suppressed in the following circumstances:

1. Parent state change alarms resulting in no self and secondary state change;
2. Self state change alarms caused by failure of higher level objects within the same subnetwork; and
3. Secondary state change alarms caused by failure of higher level objects at other subnetworks.

In a preferred embodiment, a decision table is created and stored. The decision table comprises information that indicates whether to check, forward or suppress an alarm, according to the state transition of a connection from an old state, before the alarm arose, to a new state as specified in the alarm. Initially, this description assumes that root cause alarms always arrive before their side effect alarms, however, embodiments do not require this assumption. Table 1 below is an example of the information that is created and stored in a decision table.

TABLE 1

DECISION TABLE FOR ALARM SUPPRESSION

| Self | Parent | | | |
|---|---|---|---|---|
| | 1: O->O | 2: F->O | 3: O->F | 4: F->F |
| A: O->O | check | NA | NA | NA |
| B: F->O | forward | suppress | NA | NA |
| C: O->F | forward | NA | suppress | NA |
| D: F->F | check | suppress | suppress | suppress |

Rows of the table indicate changes in self state, and columns of the table represent changes in parent object state.

For example, the table entry at row A, column 1 ("A:1") represents alarms where self state remains in the OK state, and where the parent state remains OK. Similarly, table entry B:2 indicates that an alarm is suppressed where the parent object has transitioned from FAIL to OK, and the self state has transitioned from FAIL to OK.

The states indicated by table entries A:2, A:3, A:4, B:3, B:4, C:2, and C:4 should never happen, because the parent and self states are inconsistent, and therefore the action to take upon these conditions is undefined. In a preferred embodiment, if table lookup in a decision table results in retrieving one of the entries A:2, A:3, A:4, B:3, B:4, C:2, and C:4, then a program error is raised.

In response to a given alarm, the method defined herein will Suppress, Forward, or Check an alarm, according to the state transition that resulted from the alarm. "Suppress" means that the method will suppress (or ignore) the alarm. "Forward" means that the method will forward the alarm to users. "Check" means that the method will suppress the alarm if the secondary state remains unchanged, and forward it otherwise.

The actions defined by the foregoing decision table may be classified in a plurality of scenarios.

In table entry D:2, a connection remains in FAIL self state, but the parent object state changes from FAIL to OK. The FAIL self state must be caused by previous parent failure, but the parent failure has cleared. The segment should also clear later. Thus, the process suppresses this alarm on parent objects and waits for alarms on the segment. This is the first type of side effect alarm.

In table entry D:3, a connection remains in FAIL self state, but the parent state changes from OK to FAIL. This is also the first type of side effect alarm, and it is suppressed.

In table entries B:2, C:3, and D:4, since the self state change is the same as that of parent state, it must be caused by the parent state change and thus is suppressed. This is a second type of side effect alarms.

In table entries B:1 and C:1, a connection remains in the same parent state, but changes from one self state to a different self state. Since the self state change of the segment is not caused by any parent objects of the connection, the alarm is forwarded.

In table entries A:1 and D:1, a connection remains in the same parent and self state. In response, the method will suppress the alarm if it also remains in the same A-bit state, as there is no state change, and otherwise will forward it. The latter case represents a third type of side effect alarms, and implies a failure of connecting segments in other subnetworks.

Figure 3B:
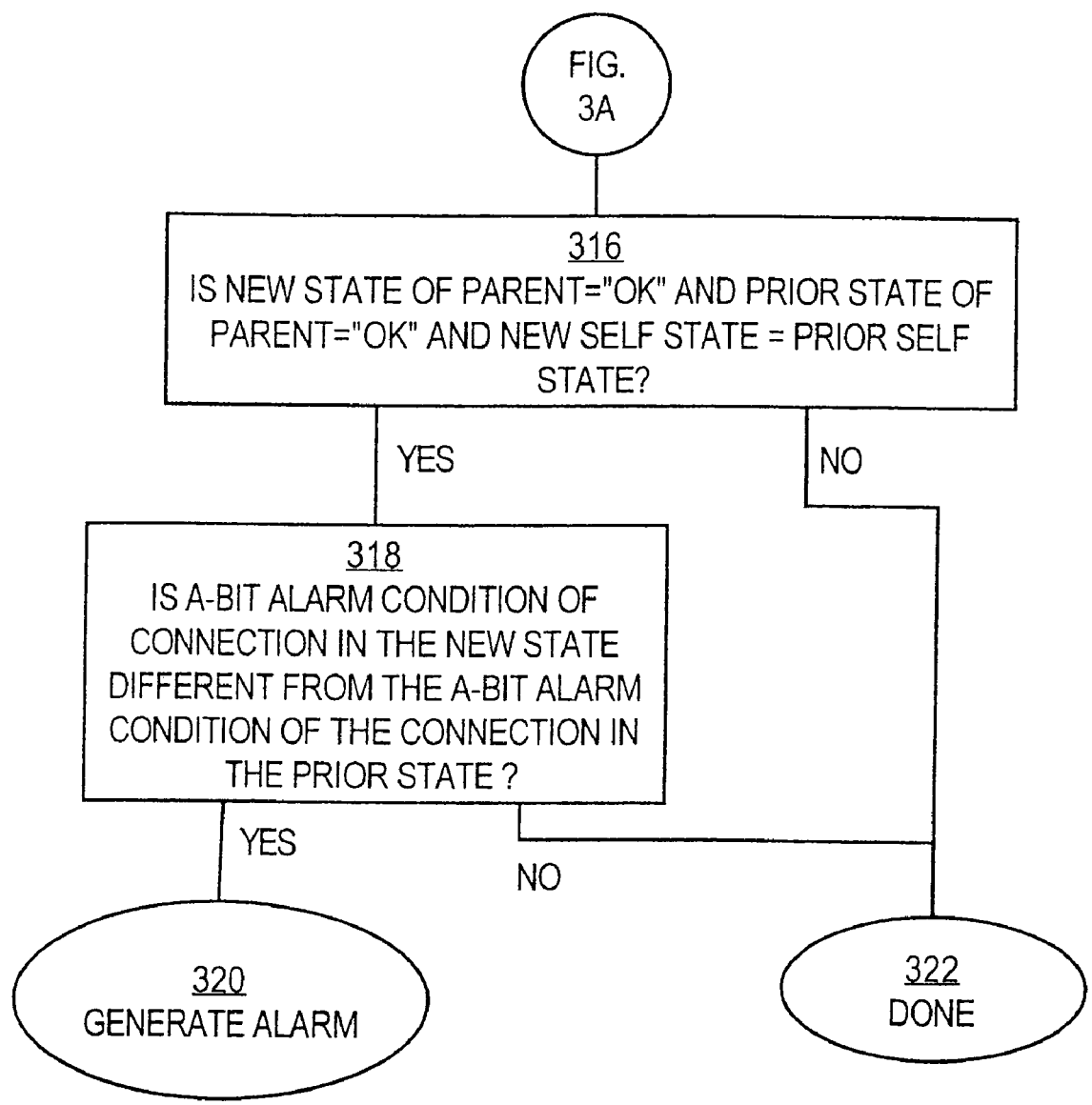
FIG. 3B is a flow diagram of further steps in the method of FIG. 3A.

FIG. 3A, FIG. 3B are flow diagrams of an embodiment of a method of suppressing side-effect alarms that can be executed by a global connection manager.

Generally, for each user connection, the current connection state as last reported to users is maintained. Given an alarm on a segment of the connection, the new connection state, as the result of the alarm, is computed. Then, according to the parent, self, and secondary state transitions, the method either suppresses the alarm or generates an alarm reflecting the new connection state, as described in previous subsection.

Referring now to FIG. 3A, in block 302, user connection information and segment alarm information is received. In block 304, a new connection state value is computed based on the current connection state and the segment alarm information.

In block 306, the method tests whether the new state of the parent object is FAIL. If so, as indicated in the logical description above, the alarm is always suppressed, as shown by block 308. If the new state of the parent object is OK, then control proceeds to block 310. In block 310, the method tests whether the prior state of the parent was FAIL, and the new self state has changed since the prior self state. If these conditions are true, then the alarm is suppressed, as indicated by block 308.

Alternatively, as shown by block 312, if the new state of the parent object is OK, and the prior state of the parent was OK, and the new self state differs from the prior self state, then an alarm is generated reflecting the new connection state.

If the tests of block 312 fail, then control passes to block 316. If both the new state and the prior state of the parent object are OK, and the new self state is the same as the prior self state, then control passes to block 318. If the secondary alarm condition of the connection in the new state is different from the secondary alarm condition of the connection in the prior state, then in block 320, an alarm is generated reflecting the new connection state.

Table 2A presents an example of source code for implementing the process of FIG. 3A, FIG. 3B. In the code, "connection" represents a user connection; "connection-.state" is the current connection state; "segmentAlarm" is an alarm on a segment; and "newState" is the new connection state.

TABLE 2A

EXAMPLE SOURCE CODE IMPLEMENTATION

```
ProcessAlarm (connection, segmentAlarm)
{
newState = connection.state + segmentAlarm;
if (FAIL == newState.parent)
    return; // suppress the alarm
if (FAIL == connection.state.parent && OK == newState.parent &&
    newState. self != connection.state.self)
    return; // suppress
if (OK == newState.parent && OK == connection.state.parent &&
    newState.self != connection.state.self)
{
    GenerateAlarm (connection.state = newState);
    return;
} if (OK == newState.parent && OK ==
connection.state.parent && newState.self == connection. state.self)
    {
        if (newState.Abit != connection.state.Abit)
            GenerateAlarm(connection.state=newState);
        return;
    }
}
```

Method of Processing Leaking Alarms

In the foregoing description, an alarm suppressing method for user connections is presented, based upon the assumption that root cause alarms always arrive before their side effect alarms. In a real network, alarms can arrive in any order. Therefore, a method of suppressing "leaking" alarms is needed. An alarm is a leaking alarm if it is a side effect alarm and it is not suppressed because it arrived before its root cause alarm.

For user connections, there are two (2) principal conditions that may cause alarms to leak. The first case is when a parent alarm on one segment (e.g., $F_1$) causes an A-bit alarm on another segment (e.g., $F_2$) and it arrives before the parent alarm does. The second case is when a segment fails due to a parent failure, but the parent failure alarm arrives after the segment (or self) failure alarm. In both cases, the side effect alarm is a leaking alarm, and according to the method presented above, the alarm would be forwarded when it should be suppressed.

An example of the first type of leaking alarm is now presented. Suppose that the initial connection state is "O/O/ O," meaning that the state of the parent, self state, and secondary state all are "OK." The abbreviation "F" will be used to indicate FAIL. Assume further that the following sequence of events occurs:

1. $e_3$ port failed
2. O/O/F alarm on $F_2$ reported, resulting in O/O/F connection state: forwarded
3. F/F/O alarm on $F_1$ reported, resulting in F/F/F connection state: suppressed
4. $e_3$ port cleared
5. O/O/O alarm on $F_1$ reported, resulting in O/O/F connection state: suppressed
6. O/O/O alarm on $F_2$ reported, resulting in O/O/O connection state: forwarded The alarm of step 2 is a side effect alarm, but is not suppressed according to the method presented above. It cannot always be suppressed, as the method cannot know if it is caused by a delayed parent alarm.

In Table 1, entries A:1, C:1 and D:1 represent possible leaking alarm conditions. In entries A:1 and D:1, which represent the first alarm leaking condition described above, the state of the parent and the self state remain unchanged, but the secondary state changes. It is possible that this secondary alarm (e.g., O/O/F on $F_2$) is caused by one or more parent alarms on other segments (e.g., $e_3$ port fail on $F_1$) that are delayed. In entry C:1, which represents the second case, the parent state remains OK but self state is changed. It is possible that the self state change is actually caused by parent object failure which is delayed.

Leaking alarms can be handled by modifying the foregoing method as follows. First, processing of possible leaking alarms is delayed by putting them into an aging alarm queue. Alarms in the queue are forwarded if either no new alarms on the connection are reported during the aging period, or for C:1 alarms, if new B:1 alarms on the same connection have arrived. The former implies that the alarm may not be a leaking alarm, while the latter implies that both alarms are root cause alarms. A (C:1, B:1) alarm pair indicates that a connection failed and later cleared while its parent state remained OK. Thus, the C:1 alarm could not have been caused by any parent object failure, but this is not known when C:1 first arrives. Thus, the C:1 alarm is aged to wait for matching B:1 alarms.

Similarly, an aged A:1 alarm with a secondary state of FAIL will be forwarded if another A:1 alarm arrives with OK secondary state. An (A:1, A:1) alarm pair with FAIL and OK A-bit states, respectively, may indicate that the A-bit fail was not caused by parent objects of the connection.

An alarm in the aging alarm queue is removed (and thus suppressed) otherwise. For example, if the processing of the alarm of step 2 above is delayed long enough, for example, until after the root cause alarm on step 3 arrives, this alarm will not be forwarded. It is suppressed and removed from the list once a decision about the alarm on step 3 is made.

A pre-determined aging period value determines how long possible leaking alarms are delayed. The aging period value can operate system wide, in which the method periodically checks all aged alarms, or can operate on a per-alarm basis by timing and checking each alarm individually. Per-alarm aging provides more accurate aging, but also involves more runtime overhead.

Even when an aging mechanism is in use, alarms may still leak, because the method does not know how long an alarm should be delayed. If the alarm on step 3 did not arrive on time, then the alarm on step 2 will leak. The method must then make sure that the alarm on step 6 is not suppressed, so that the previously leaked O/O/F alarm on $F_2$ is cleared after $e_3$ port has recovered. In other words, B:2 and D:2 alarms which clear parent alarm (e.g., O/O/O on $F_1$) are not always be suppressed. Since the process does not know if the A-bit alarm on another segment (e.g., $F_2$) and caused by the previous parent alarm has been cleared, the alarm is thus aged. If A-bit alarm then arrives, both alarms are suppressed. Otherwise, it is forwarded to clear the previously leaked A-bit alarm.

In another embodiment, the last forwarded alarm is checked before another alarm is forwarded. This test helps detect previously leaked alarms. To illustrate this principle, consider an example in which the alarm on step 2 has leaked. When processing the alarm on step 5, the process can determine that the connection has already been recovered by checking the last forwarded alarm. Based on the check, the process may determine that there is no need to forward this alarm. If the alarm on step 2 did not leak, then the process cannot determine whether the alarm on step 5 should be suppressed, because the A-bit alarm may not be caused by this parent alarm. Accordingly, the alarm is aged. The alarms are suppressed if the alarm on step 6 arrives on time, and that alarm is also suppressed. Otherwise, both alarms will be forwarded.

Table 3 presents decision logic based on the foregoing description.

TABLE 3

EXTENDED ALARM SUPPRESSING LOGIC

| Self | Parent | | | |
|---|---|---|---|---|
|  | 1: O->O | 2: F->O | 3: O->F | 4: F->F |
| A: O->O | aging1 | NA | NA | NA |
| B: F->O | forward | aging3 | NA | NA |
| C: O->F | aging2 | NA | suppress | NA |
| D: F->F | aging1 | aging3 | suppress | suppress |

In Table 3, the term "Suppress" means to immediately suppress the alarm, and the term "Forward" means to immediately forward the alarm. The term "Aging1" means to immediately suppress the alarm if secondary state remains unchanged or it is the same as the last forwarded alarm, and age it otherwise. When aged, it is either forwarded when another A:1 alarm arrives with OK secondary state, suppressed when other alarms on the connection arrived before the aging period is over, or forwarded otherwise. The term "Aging2" means to suppress the alarm if it is the same as last forwarded alarm, and age it otherwise. When aged, if a B:1 alarm on the same connection arrives, forward both alarms, if no other alarms on the connection reported before the aging period is over, generate the aged C:1 alarm, otherwise suppress it.

The term "Aging3" means to suppress the alarm if it is the same as last forwarded alarm, and age it otherwise. For aged alarm, the term means to forward it if no other alarms on the connection reported before the aging period is over, and suppress it otherwise.

Alarms associated with the conditions of entry D:3 of Table 3 alarms may be suppressed for different reasons. It is possible that this is a delayed root cause alarm for the previous alarm that resulted in FAIL self state. It is suppressed, as it does not result in new self or A-bit state.

Figure 4A:
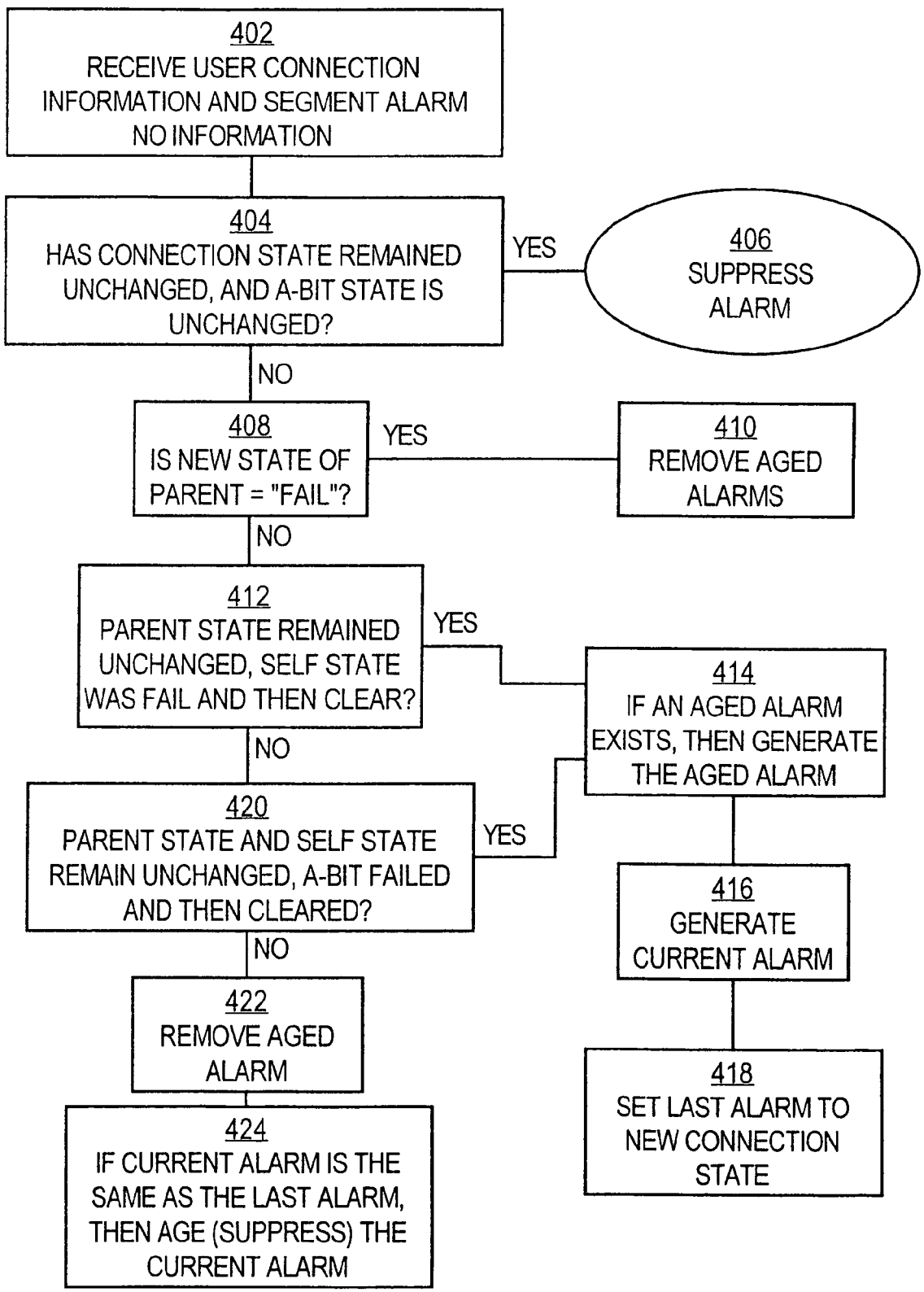
FIG. 4A is a flow diagram of a process of selectively suppressing leaking side-effect alarms.
Figure 4B:
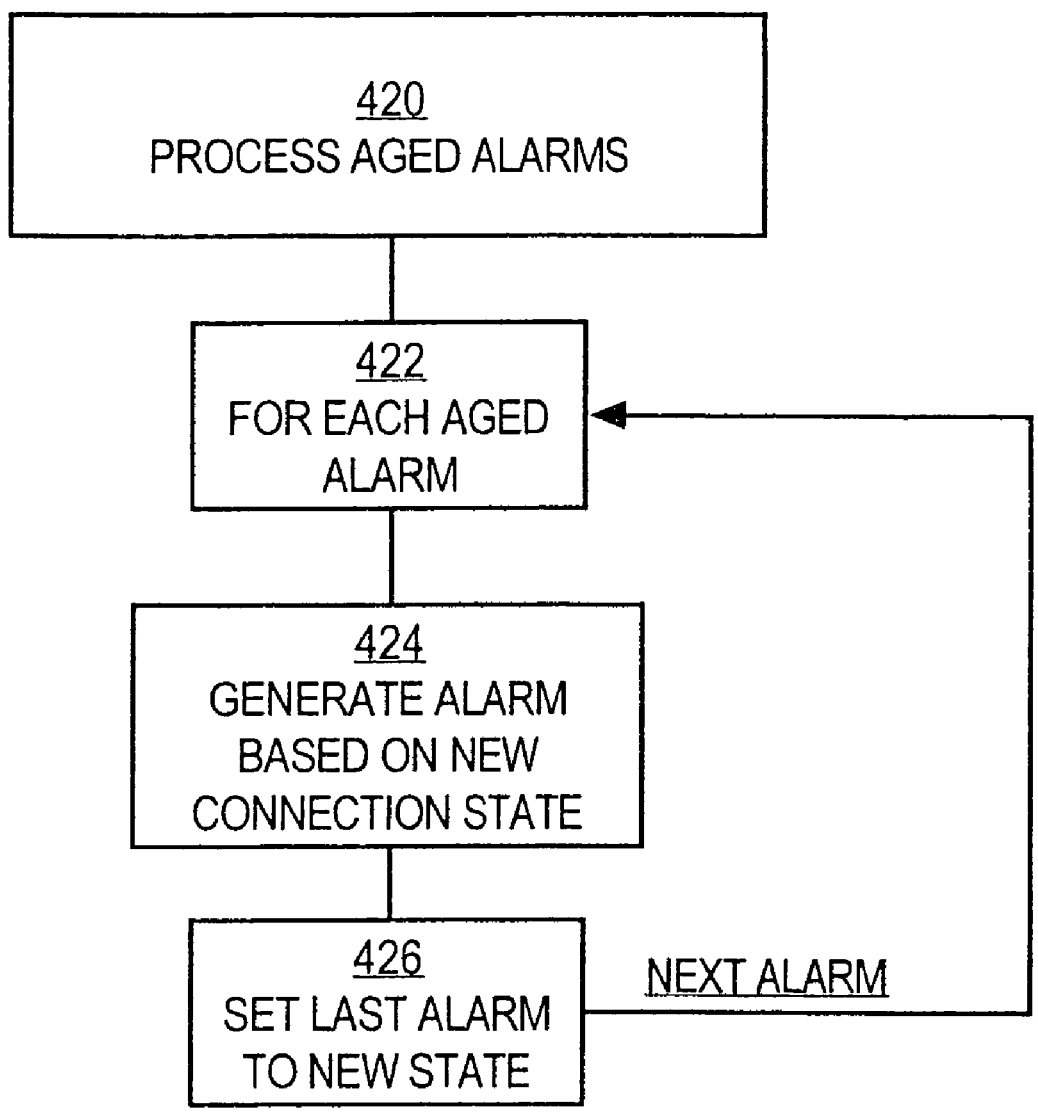
FIG. 4B is a flow diagram of a process of selectively suppressing leaking side-effect alarms.

FIG. 4A, FIG. 4B are flow diagrams of a process of selectively suppressing leaking side-effect alarms based on the foregoing description.

Referring first to FIG. 4A, in block 402, user connection information and segment alarm information is received. In an embodiment, block 402 involves receiving data values that describe a connection between two nodes in a network, and receiving information that specifies an alarm that has been generated for a segment of the connection.

In block 404, the process determines whether the state of the connection has remained unchanged as a result of the alarm, and whether the A-bit state is unchanged. This represents the cases of entries A:1, D:1 of Table 3. If so, then the alarm is suppressed, as shown in block 406.

In block 408, the process determines whether the new state of the parent object as a result of the alarm is FAIL. This represents entries C:3, D:3, D:4 of Table 3. If so, then all aged alarms are removed, as shown in block 410. A method of processing aged alarms is separately discussed below in connection with FIG. 4B.

In block 412, the process determines whether as a result of the alarm, the parent object state remained unchanged, but the self state was FAIL and then transitioned to OK or OK as a result of the alarm. This represents case B:1, in which both alarms were not caused by a failure of the element represented by the parent object. The previous aged alarm is a leaking alarm, and both the current alarm and any aged alarm should be generated. Accordingly, control is passed to the steps of block 414, block 416, and block 418. In block 414, if an aged alarm exists, then the aged alarm is generated or forwarded. In block 416, the current alarm is generated or forwarded. In block 418, the current or last alarm is set to the new connection state.

Referring now to FIG. 4B, as indicated by block 420, the process tests whether the parent object state and self state have remained unchanged, but the A-bit state failed and then cleared. This represents entries A:1 and D:1 of Table 3. Since both alarms are not caused by a failure of the parent object, the previous aged alarm is a leaking alarm. Therefore, the current alarm and any aged alarms are generated or forwarded, as indicated by block 414, block 416, and block 418.

If all the foregoing tests are negative, then the result represents entries C:1, B:2, or D:2 of Table 3. In these cases, the alarm may be a leaking alarm. As shown by block 422, any existing aged alarm is removed. If it is the same as the last alarm, then it is added to the aging queue and thereby suppressed, as shown by block 424. Otherwise, the alarm is aged, and the process waits for further alarms. An aged alarm will be generated after the pre-determined aging period, unless it is removed from the aging queue. An aged alarm associated with a parent object in the OK state and a self state of FAIL is also generated later when an alarm with a parent object in the OK state and a self state of OK is generated. Otherwise, aged alarms are removed when processing other alarms occurs.

Table 2B presents an example of a source code that may be used to implement the foregoing process. As with the alarm process shown in Table 2A, the following code may be invoked each time a new alarm is received, which is either forwarded, suppressed, or aged.

TABLE 2B

EXAMPLE SOURCE CODE IMPLEMENTATION

```
ProcessNewAlarm (connection, segmentAlarm)
{
    if (connection.state == newState)
    {
        // Case A:1, D:1 (when A-bit remains unchanged): suppress if no state change
        return;
    }
    if (FAIL == newState.parent)
    {
        // Cases C:3, D:3, D:4: Always suppress when new parent state is FAIL
        removeAgedAlarms (connection);
    }
    else // OK == newState.parent
    {
        if (OK == connection.state.parent && FAIL == connection.state.self && OK == newResultState)
        {
            // Case B:1
            // Parent state remains unchanged, self failed & then cleared
            // Both alarms not caused by parent object failure
            // Previous aged alarm is a leaking alarm
            // Generate both aged (if any) and current alarms
            if (exists aged alarms)
                GenerateAlarm (agedAlarm);
            GenerateAlarm (connection.state = newState);
            lastAlarm = newState;
            return;
        }
        if (OK == connection.state.parent && connection.state.self == newResultState)
        {
            // Case A:1, D:1 (when A-bit changes)
            // Parent & self remain unchanged, abit failed & then cleared
            // Both alarms not caused by parent object failure
            // Previous aged alarm is a leaking alarm
            // Generate both aged (if any) and current alarms
            if (exists aged alarms)
                GenerateAlarm (agedAlarm);
            GenerateAlarm (connection.state = newState);
            lastAlarm = newState;
            return;
        }
        // Cases C:1, B:2, D:2
        // May be a leaking alarm
        // Suppress it if same as last alarm
        // Age it otherwise and wait for further alarms
```

TABLE 2B-continued

EXAMPLE SOURCE CODE IMPLEMENTATION

```
    // Aged alarms will be generated after aging period (if not removed)
    // Aged alarm with Parent=OK, self=FAIL will also be generated
    // later when alarm with Parent=OK, self=OK is processed
    // Aged alarms are otherwise removed (when processing other alarms)
    removeAgedAlarm ( );
    if (newState != lastAlarm)
        ageAlarm (newState);
    }
    return;
}
```

Further, the code segment set forth in Table 2C is invoked periodically for processing aged alarms.

TABLE 2C

CODE SEGMENT FOR PROCESSING AGED ALARMS

```
ProcessAgedAlarm ( )
{
    for each agedAlarm do
    {
        GenerateAlarm (connection.state = newState);
        lastAlarm = newState;
    }
}
```

OPERATIONAL EXAMPLES

Selected examples of alarm suppressing are now described. Ideally, an alarm suppressing process should suppress all side-effect alarms and no root cause alarms. In practical, this is impossible, because it is hard to tell root cause alarms from side effect alarms. Therefore, the objective is to suppress as many side effect alarms as possible, without suppressing root cause alarms. An alarm suppressing process is considered correct if (1) it does not suppress any root cause alarms unless it is a redundant one; and (2) it gives users a consistent view reflecting real connection states.

The conditions can be easily satisfied by not suppressing any alarms, however, only processes that do suppress side effect alarms have practical application. Further, alarms need not be suppressed or forwarded immediately, but a proper decision on an alarm should be made eventually.

Condition (1) reflects the fact that strictly speaking, one alarm is redundant to another if they result in the same connection state. More generally speaking, a first alarm is redundant to a second alarm if the connection state resulted in by the former is contained by the connection state resulted in by the latter. A connection state $S_{11}/S_{12}/S_{13}$ is contained by another state $S_{21}/S_{22}/S_{23}$ if either $S_{21}$=FAIL and $S_{11}$=OK, or $S_{11}$=$S_{21}$ and $S_{22}$=FAIL and $S_{12}$=OK, or $S_{11}$=$S_{21}$ and $S_{22}$=$S_{12}$ and $S_{23}$=FAIL and $S_{13}$=OK, where $S_{11}$ and $S_{21}$ are parent states, $S_{12}$ and $S_{22}$ are self states, and $S_{13}$ and $S_{23}$ are A-bit states. Thus, an A-bit fail only alarm is contained by a self fail alarm, which in turn is contained by a parent fail alarm. Thus, the first condition basically means that if a connection is already in FAIL parent or self state, the FAIL A-bit alarm may be suppressed, even if it is not actually caused by the previous parent or self failure. From the user's point of view, a parent failure or self failure eventually will cause A-bit failure.

The second condition addresses leaking alarms, and is necessary to avoid situations where leaked side effect alarms give users wrong picture of actual connection state. For example, if a connection fails due to a parent object failure, and later is cleared, and the self fail alarm is forwarded or leaked, then the self clear alarm is not suppressed. However, both alarms may be suppressed completely.

Example alarm suppressing scenarios for two (2) segment connections, of the type shown in FIG. 2, are now described. The same process can be used for connections of three (3) or more segments. Related scenarios are grouped into logic tables below. In each table, the first column represents alarms that are received by the connection manager. The second column (with three (3) subcolumns) represents states of two (2) segments and the connection. The third column represents the actions taken by the algorithm for the alarm. Symbols "S," "G," and "X" are used to designate one of the following actions: "S" means that the alarm is suppressed immediately without aging; "G" means that the alarm is first aged and later forwarded; and "X" means that the alarm is first aged and later suppressed.

Different actions may be taken for the same alarm according to the timing when a particular alarm and other alarms arrive, as well as the length of the aging period. Thus, the third column may have more than one subcolumn. The last column indicates the state transition as defined in Table 3, with additional comments.\

Segment Fails/Clear Scenario

In this scenario, a segment failed and later is cleared. The segment failure was not caused by parent object failure.

TABLE 4

ALARM SUPPRESSION WHEN SEGMENT FAILS AND CLEARS

| Alarm | State (P/S/A) | | | Action | Note |
|---|---|---|---|---|---|
| | $F_1$ | $F_2$ | Conn | 1 | |
| Case A: | O/O/O | O/O/O | O/O/O | | |
| $F_1$ fail | O/F/O | | O/F/O | G | C:1. first aged, may be forwarded later |
| $F_1$ clear | O/O/O | | O/O/O | G | B:1. always forwarded |
| Case B: | O/O/O | O/F/O | O/F/O | | $F_2$ already failed |
| $F_1$ fail | O/F/O | O/F/O | O/F/O | S | D:1. redundant root cause alarm |
| $F_1$ clear | O/O/O | | O/F/O | S | D:1. redundant root cause alarm |
| $F_2$ clear | | O/O/O | O/O/O | G | B:1. always forwarded |

In Case A of this scenario, for example, both alarms are root cause alarms. The first alarm ($F_1$ fail) is first aged. If the second alarm arrives after the aging period is over, then the first alarm is forwarded. Otherwise, the second alarm causes both alarms to be forwarded. In either case, no alarm is suppressed.

In Case B, the first two alarms are suppressed, as they are redundant alarms. The last alarm is forwarded after the aging period is over, and reflects the correct connection state.

A-Bit Failure

In this scenario, an element of customer premises equipment at $e_2$ failed, causing A-bit state of $F_2$ to fail. Note that the customer premises equipment is not considered as a parent object of the connection. The customer premises equipment later is cleared. Four (4) cases are considered.

A-bit alarm is not suppressed unless the connection is already in parent/self FAIL state.

TABLE 5

A-BIT FAILURE SCENARIO

| Alarm | State (P/S/A) | | | Action | | Note |
|---|---|---|---|---|---|---|
| | $F_1$ | $F_2$ | Conn | 1 | 2 | |
| Case A: | O/O/O | O/O/O | O/O/O | | | |
| $e_2$ A-bit fail | | O/O/F | O/O/F | G | | A:1. A-bit changes, diff from last |
| $e_2$ A-bit clear | | O/O/O | O/O/O | G | | A:1. A-bit changes, diff from last |
| Case B: | O/O/F | O/O/O | O/O/F | | | $e_1$ port already failed |
| $e_2$ A-bit fail | | O/O/F | O/O/F | S | | A:1. redundant root cause alarm |
| $e_2$ A-bit clear | | O/O/O | O/O/O | G | | A:1. A-bit changes, diff from last |
| Case C: | O/F/O | O/O/O | O/F/O | | | $F_1$ already failed |
| $e_2$ A-bit fail | | O/O/F | O/F/F | G | X | D:1. possible leaking alarm |
| $e_2$ A-bit clear | | O/O/O | O/F/O | G | X | D:1. suppress if no leaking |
| $F_1$ clear | O/O/O | | O/O/O | G | G | B:1. always forwarded |
| Case D: | F/F/O | O/O/F | F/F/F | | | $e_1$ port already failed |
| $e_2$ A-bit fail | | O/O/F | F/F/F | S | | D:4. always suppressed |
| $e_2$ A-bit clear | | O/O/O | F/F/F | S | | D:4. always suppressed |
| $e_1$ clear | O/O/O | | O/O/O | G | | B:1. always forwarded |

Case A and Case B are similar to those of the like-named cases illustrated in Table 4. In Case C, there are two possible paths for alarm suppressing. The A-bit fail alarm is first aged, but later is either forwarded when the second alarm did not arrive on time, or suppressed otherwise. The A-bit clear alarm will be forwarded if the A-bit fail alarm was forwarded and suppressed otherwise. The $F_1$ clear alarm is always forwarded. Users always see the correct connection state (i.e., O/F/O or O/O/O) with or without the last $F_1$ clear alarm.

Parent Object Failure Scenario

In this scenario, element $e_3$, the parent object of $F_1$, fails and is later cleared. Four (4) alarms are reported about the failure and recovery of $e_3$ and $F_1$. Six (6) different cases have been considered, according to the order the four alarms arrive. For each case, there can be one, two, or three different subcases, according to when aging period ends. In either case, the algorithm either suppresses all alarms, or, when side effect alarm leaks, forwards the follow-up clear alarm.

TABLE 6

PARENT OBJECT FAILURE SCENARIO

| Alarm | State (P/S/A) | | | Action | | | Note |
|---|---|---|---|---|---|---|---|
| | $F_1$ | $F_2$ | PVC | 1 | 2 | 3 | |
| Case A: | O/O/O | O/O/O | O/O/O | | | | |
| $e_3$ fail | F/F/O | | F/F/O | S | | | C:3. always suppressed |
| $F_2$ A-bit fail | | O/O/F | F/F/F | S | | | D:4. always suppressed |
| e3 clear | O/O/O | | O/O/F | G | X | | B:2. possible leaking alarm |
| $F_2$ A-bit clear | | O/O/O | O/O/O | G | X | | A:1. suppressed if no leaking |
| Case B: | O/O/O | O/O/O | O/O/O | | | | |
| $F_2$ A-bit fail | | O/O/F | O/O/F | G | X | X | A:1. possible leaking alarm |
| $e_3$ fail | F/F/O | | F/F/F | S | S | S | C:3. always suppressed |
| e3 clear | O/O/O | | O/O/F | S | G | X | B:2. possible leaking alarm |
| $F_2$ A-bit clear | | O/O/O | O/O/O | G | G | X | A:1. suppressed if no leaking |
| Case C: | O/O/O | O/O/O | O/O/O | | | | |
| $e_3$ fail | F/F/O | | F/F/O | S | | | C:3. always suppressed |
| $F_2$ A-bit fail | | O/O/F | F/F/F | S | | | D:4. always suppressed |
| $F_2$ A-bit clear | | O/O/O | F/F/O | S | | | D:4. always suppressed |
| e3 clear | O/O/O | | O/O/O | S | | | B:2. same as last forwarded alarm |
| Case D: | O/O/O | O/O/O | O/O/O | | | | |
| $e_3$ fail | | O/O/F | O/O/F | G | X | | A:1. possible leaking alarm |
| $F_2$ A-bit fail | F/F/O | | F/F/F | S | S | | C:3. always suppressed |
| $F_2$ A-bit clear | | O/O/O | F/F/O | S | S | | D:4. always suppressed |
| e3 clear | O/O/O | | O/O/O | G | S | | B:2. suppressed if no leaking |
| Case E: | O/O/O | O/O/O | O/O/O | | | | |
| $e_3$ fail | F/F/O | | F/F/O | S | | | C:3. always suppressed |
| e3 clear | O/O/O | | O/O/O | S | | | B:2. same as last forwarded alarm |
| $F_2$ A-bit fail | | O/O/F | O/O/F | G | | | A:1. alarm aged |
| $F_2$ A-bit clear | | O/O/O | O/O/O | G | | | A:1. both alarms forwarded |
| Case F: | O/O/O | O/O/O | O/O/O | | | | |

TABLE 6-continued

PARENT OBJECT FAILURE SCENARIO

| Alarm | State (P/S/A) | | | Action | | | Note |
|---|---|---|---|---|---|---|---|
| | $F_1$ | $F_2$ | PVC | 1 | 2 | 3 | |
| $F_2$ A-bit fail | | O/O/F | O/O/F | G | | | A:1. alarm aged |
| $F_2$ A-bit clear | | O/O/O | O/O/O | G | | | A:1. both alarm forwarded |
| $e_3$ fail | F/F/O | | F/F/O | S | | | C:3. always suppressed |
| e3 clear | O/O/O | | O/O/O | S | | | B:2. same as last forwarded alarm |

In Case B-1, an $F_2$ A-bit fail alarm leaked, due to delay of an $e_3$ fail alarm. When this happens, the $F_2$ A-bit clear alarm will not be suppressed, as the last reported connection state is different with the new connection state. If, on the other hand, $F_2$ A-bit fail alarm did not leak, the $F_2$ A-bit clear alarm will be suppressed.

Alarms may also leak if a root cause alarm arrives after the side effect alarm has been cleared, as in Case F-1, where $e_3$ fail alarm arrives after $F_2$ A-bit clear alarm. It is impossible for any process or algorithm to determine if an $e_3$ fail alarm is a root alarm, until after $e_3$ fail alarm has arrived.

Accordingly, a process that suppresses most side effect alarms, if the aging period is properly configured, has been described. Since a complete alarm history is not maintained or check, there are certain cases where root cause alarms and side effect alarms cannot be distinguished, e.g., Case C-2 as described in the A-Bit Failure scenario section. There are also cases where side effect alarms leak, due to an insufficient aging period, e.g., Case B-1 in the Parent Object Failure scenario, or the delay of root cause alarms, e.g., Case F-1 in the Parent Object Failure scenario.

Hardware Overview

Figure 5:
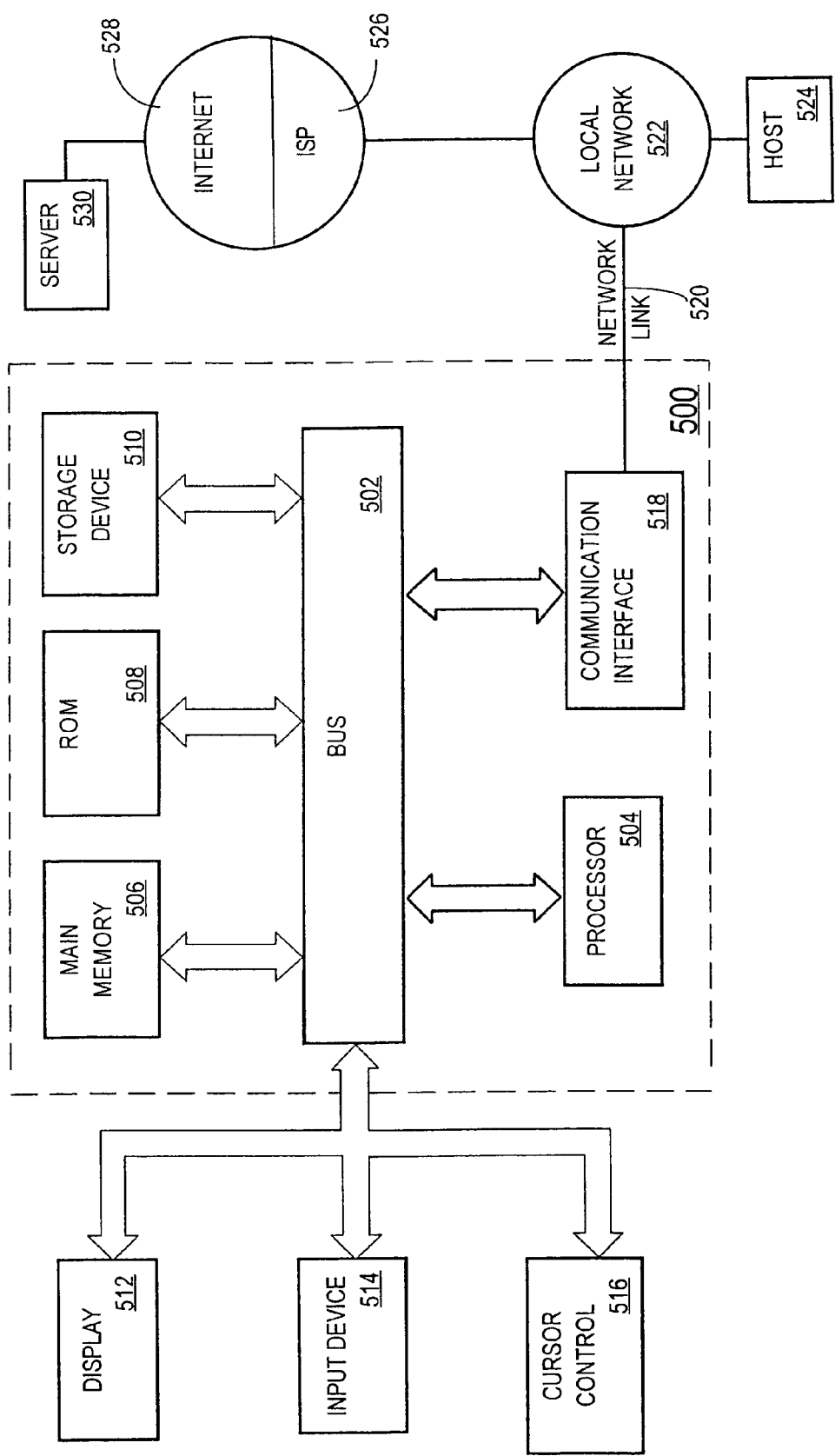
FIG. 5 is a block diagram of a computer system with which an embodiment may be used.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for suppressing side-effect alarms in network management systems. According to one embodiment of the invention, suppressing side-effect alarms in network management systems is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522.

For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for suppressing side-effect alarms in network management systems as described herein.

The received code may be executed by processor 504 as it is received, and/or stored in storage device 510, or other non-volatile storage for later execution. In this manner, computer system 500 may obtain application code in the form of a carrier wave.

An alarm suppression system and method have been described. Beneficially, the invention increases the usability of a network management system by reducing the number of unnecessary alarms that are generated or displayed when a network failure occurs. Only alarms about root causes will be generated. This allows users to identify problem more easily and quickly. The disclosed system and method are simple to implement and do not require customization, rule writing, etc. The system and method will effectively suppress unnecessary alarms as long as the root cause alarm arrives on time, facilitated by a configurable aging period. The system and method are efficient, providing rapid decision-making without database I/O and complex rule evaluation.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of suppressing a side-effect alarm in a network management system that includes a plurality of managed network elements, wherein the side-effect alarm arrives at the network management system before a triggering alarm, the method comprising the steps of:

creating and storing state information for each of the managed network elements, wherein the state information comprises a current connection state value and a parent state value;

receiving segment alarm information that identifies a first arriving alarm relating to a segment of the connection;

determining a new connection state value to which the connection transitions as a result of the segment alarm identified in the segment alarm information and based on the current connection state value;

selectively suppressing or forwarding an alarm reflecting the new connection state value based on the parent state value, a self state transition value, and a secondary state transition value.

2. The method as recited in claim 1, wherein the step of selectively suppressing or forwarding an alarm comprises the step of determining whether to suppress or generate an alarm reflecting the new connection state value based on the parent state value, the self state transition value, and a secondary state transition value according to a decision table.

3. The method as recited in claim 2 wherein the decision table has the form:

|  | Parent | | | |
| --- | --- | --- | --- | --- |
| Self | 1: O->O | 2: F->O | 3: O->F | 4: F->F |
| A: O->O | aging1 | NA | NA | NA |
| B: F->O | forward | aging3 | NA | NA |
| C: O->F | aging2 | NA | suppress | NA |
| D: F->F | aging1 | Aging3 | suppress | suppress | wherein "O" indicates an "OK" state, "F" indicates a "Fail" state, "→" indicates a transition among states, "forward" indicates forwarding an alarm to an end user or external application, "suppress" indicates suppressing an alarm, and "aging1," "aging2," and "aging3" indicates queuing the alarm in an aging queue until pre-determined conditions result in suppressing, forwarding, or removing the alarm from the queue.

4. The method as recited in claim 3, wherein the step of selectively suppressing or forwarding an alarm comprises the steps of forwarding an alarm arising under conditions corresponding to entry A:1 of the decision table, if another A:1 alarm arrives with a secondary state value of OK.

5. The method as recited in claim 3, wherein the step of selectively suppressing or forwarding an alarm comprises the steps of forwarding an alarm arising under conditions corresponding to entry C:1 of the decision table, if an alarm arising under conditions corresponding to entry B:1 of the decision table subsequently arrives.

6. The method as recited in claim 3, wherein the step of selectively suppressing or forwarding an alarm comprises the steps of queuing an alarm arising under conditions corresponding to entry C:1 of the decision table until an alarm arising under conditions corresponding to entry B:1 of the decision table subsequently arrives.

7. The method as recited in claim 1, further comprising the step of queuing the segment alarm information in an alarm queue, and wherein the step of selectively suppressing or forwarding an alarm comprises the steps of removing the alarm from the queue when the parent state value transitions to FAIL as a result of the alarm.

8. The method as recited in claim 7, wherein the step of selectively suppressing or forwarding an alarm comprises the steps of:
   determining that the parent state value remained unchanged and that the current connection state value transitioned to FAIL as a result of the alarm and later cleared;
   generating an alarm for any segment alarm that is then currently in the queue;
   generating an alarm for the segment alarm information; and
   setting the last alarm to the current connection state value.

9. The method as recited in claim 1, further comprising the step of queuing the segment alarm information in an alarm queue, and wherein the step of selectively suppressing or forwarding an alarm comprises the steps of:
   determining that the parent state value and current connection state value remained unchanged and that a secondary state value transitioned to FAIL as a result of the alarm and later cleared;
   generating an alarm for any segment alarm that is then currently in the queue;
   generating an alarm for the segment alarm information; and
   storing the segment alarm information as a last alarm value.

10. The method as recited in claim 9, wherein the step of selectively suppressing or forwarding an alarm comprises the steps of:
    removing from the queue any aged alarm information that is in the queue;
    determining that the segment alarm information is the same as the last alarm value;
    storing the segment alarm information in the queue to thereby suppress the alarm condition.

11. The method as recited in claim 1, wherein the step of selectively suppressing or forwarding an alarm comprises the steps of suppressing the alarm condition when the current connection state value remains unchanged as a result of the alarm and when a secondary state remains unchanged as a result of the alarm.

12. The method as recited in claim 1, further comprising the steps of:
    queuing the segment alarm information in an alarm queue;
    for all segment alarm information that is in the queue:
    generating an alarm based on the current connection state value;
    setting a last alarm value associated with the connection to the current connection state value.

13. The method as recited in claim 1, further comprising the step of queuing the segment alarm information in an alarm queue, and wherein the step of selectively suppressing or forwarding an alarm comprises the steps of forwarding each alarm represented by segment alarm information in the queue, if no new alarm on the connection is reported during a pre-determined aging period.

14. The method as recited in claim 1, further comprising the step of queuing the segment alarm information in an alarm queue, and wherein the step of selectively suppressing or forwarding an alarm comprises the steps of forwarding each alarm represented by segment alarm information in the queue, if a new alarm on the connection is reported during a pre-determined aging period and the segment alarm information resulted in a transition of the parent value from OK to FAIL.

15. The method as recited in claim 1, further comprising the step of queuing the segment alarm information in an alarm queue, and wherein the step of selectively suppressing or forwarding an alarm comprises the steps of aging the segment alarm information in the queue when the connection failed and later cleared up while the parent state value remains the same.

16. The method as recited in claim 1, further comprising the steps of:
    queuing the segment alarm information in an alarm queue; and
    maintaining a plurality of pre-determined aging time values, wherein each of the plurality of pre-determined aging time values is associated with different segment alarm information that is stored in the queue.

17. The method as recited in claim 1, further comprising the step of checking the last forwarded alarm before forwarding the segment alarm information.

18. An apparatus for suppressing a side-effect alarm in a network management system that includes a plurality of managed network elements, wherein the side-effect alarm arrives at the network management system before a triggering alarm, the apparatus comprising:
    means for creating and storing state information for each of the managed network elements, wherein the state information comprises a current connection state value and a parent state value;
    means for receiving segment alarm information that identifies a first arriving alarm relating to a segment of the connection;
    means for determining a new connection state value to which the connection transitions as a result of the segment alarm identified in the segment alarm information and based on the current connection state value;
    means for selectively suppressing or forwarding an alarm reflecting the new connection state value based on the parent state value, a self state transition value, and a secondary state transition value.

19. The apparatus as recited in claim 18, wherein the means for selectively suppressing or forwarding an alarm comprises a means for determining whether to suppress or generate an alarm reflecting the new connection state value based on the parent state value, the self state transition value, and a secondary state transition value according to a decision table.

20. The apparatus as recited in claim 19, wherein the decision table has the form:

|  | Parent | | | |
| --- | --- | --- | --- | --- |
| Self | 1: O->O | 2: F->O | 3: O->F | 4: F->F |
| A: O->O | aging1 | NA | NA | NA |
| B: F->O | forward | aging3 | NA | NA |
| C: O->F | aging2 | NA | suppress | NA |
| D: F->F | aging1 | Aging3 | suppress | suppress | wherein "O" indicates an "OK" state, "F" indicates a "Fail" state, "→" indicates a transition among states, "forward" indicates forwarding an alarm to an end user or external application, "suppress" indicates suppressing an alarm, and "aging1," "aging2," and "aging3" indicates queuing the alarm in an aging queue until pre-determined conditions result in suppressing, forwarding, or removing the alarm from the queue.

21. The apparatus as recited in claim 18, wherein the means for selectively suppressing or forwarding an alarm comprises a means for suppressing the alarm condition when the current connection state value remains unchanged as a result of the alarm and when a secondary state remains unchanged as a result of the alarm.

22. The apparatus as recited in claim 18, wherein the means for selectively suppressing or forwarding an alarm comprises means for queuing the segment alarm information, and means for removing the alarm from the queue when the parent state value transitions to FAIL as a result of the alarm.

23. The apparatus as recited in claim 18, wherein the means for selectively suppressing or forwarding an alarm comprises:
   means for queuing the segment alarm information;
   means for determining that the parent state value remained unchanged and that the current connection state value transitioned to FAIL as a result of the alarm and later cleared;
   means for generating an alarm for any segment alarm that is then currently in the queue;
   means for generating an alarm for the segment alarm information; and
   means for setting the last alarm to the current connection state value.

24. The apparatus as recited in claim 18, wherein the means for selectively suppressing or forwarding an alarm comprises means for queuing the segment alarm information and means for forwarding each alarm represented by segment alarm information in the queue, if no new alarm on the connection is reported during a pre-determined aging period.

25. The apparatus as recited in claim 18, further comprising means for queuing the segment alarm information, and means for maintaining a plurality of pre-determined aging time values, wherein each of the plurality of pre-determined aging time values is associated with different segment alarm information that is stored in the queue.

26. A computer-readable medium storing one or more sequences of instructions for suppressing out-of-order side-effect alarms in a network management system that includes a plurality of managed network elements, wherein execution of the one or more sequences of instructions by one or more processors causes the one or more processors to perform the steps of:
   creating and storing state information for each of the managed network elements, wherein the state information comprises a current connection state value and a parent state value;
   receiving segment alarm information that identifies a first arriving alarm relating to a segment of the connection;
   determining a new connection state value to which the connection transitions as a result of the segment alarm identified in the segment alarm information and based on the current connection state value;
   selectively suppressing or forwarding an alarm reflecting the new connection state value based on the parent state value, a self state transition value, and a secondary state transition value.

27. A network management system that automatically suppresses out-of-order side-effect alarms, comprising:
   one or more connection managers, wherein each connection manager manages connections between network end stations in a particular sub-network of the network;
   an alarm suppression mechanism that is communicatively coupled to the connection managers, and comprising one or more sequences of instructions which, when executed by one or more processors, carry out the steps of:
   creating and storing state information for each of the network elements, wherein the state information comprises a current connection state value and a parent state value;
   receiving segment alarm information that identifies a first arriving alarm relating to a segment of the connection;
   determining a new connection state value to which the connection transitions as a result of the segment alarm identified in the segment alarm information and based on the current connection state value;
   selectively suppressing or forwarding an alarm reflecting the new connection state value based on the parent state value, a self state transition value, and a secondary state transition value.

28. An apparatus for suppressing a side-effect alarm in a network management system that includes a plurality of managed network elements, wherein the side-effect alarm arrives at the network management system before a triggering alarm, the apparatus comprising:
   a network interface coupled to the managed network and receiving network messages therefrom;
   a processor coupled to the network interface and receiving network messages therefrom, wherein the processor is configured to perform the steps of:
   creating and storing state information for each of the managed network elements, wherein the state information comprises a current connection state value and a parent state value;
   receiving segment alarm information that identifies a first arriving alarm relating to a segment of the connection;
   determining a new connection state value to which the connection transitions as a result of the segment alarm identified in the segment alarm information and based on the current connection state value;
   selectively suppressing or forwarding an alarm reflecting the new connection state value based on the parent state value, a self state transition value, and a secondary state transition value.

29. The apparatus as recited in claim 28, wherein processor is further configured for determining whether to suppress or generate an alarm reflecting the new connection state value based on the parent state value, the self state transition value, and a secondary state transition value according to a decision table.

30. The apparatus as recited in claim 29, wherein the decision table has the form:

| Self | Parent | | | |
| --- | --- | --- | --- | --- |
| | 1: O->O | 2: F->O | 3: O->F | 4: F->F |
| A: O->O | aging1 | NA | NA | NA |
| B: F->O | Forward | aging3 | NA | NA |
| C: O->F | aging2 | NA | Suppress | NA |
| D: F->F | aging1 | Aging3 | Suppress | Suppress | wherein "O" indicates an "OK" state, "F" indicates a "Fail" state, "→" indicates a transition among states, "forward" indicates forwarding an alarm to an end user or external application, "suppress" indicates suppressing an alarm, and "aging1," "aging2," and "aging3"

indicates queuing the alarm in an aging queue until pre-determined conditions result in suppressing, forwarding, or removing the alarm from the queue.

31. The apparatus as recited in claim 28, wherein the processor is further configured for selectively suppressing or forwarding an alarm by suppressing the alarm condition when the current connection state value remains unchanged as a result of the alarm and when a secondary state remains unchanged as a result of the alarm.

32. The apparatus as recited in claim 28, wherein the processor is further configured for selectively suppressing or forwarding an alarm by removing the alarm from the queue when the parent state value transitions to FAIL as a result of the alarm.

33. The apparatus as recited in claim 28, wherein the processor is further configured for queuing the segment alarm information and for selectively suppressing or forwarding an alarm by:

determining that the parent state value remained unchanged and that the current connection state value transitioned to FAIL as a result of the alarm and later cleared;

generating an alarm for any segment alarm that is then currently in the queue;

generating an alarm for the segment alarm information; and setting the last alarm to the current connection state value.

34. The apparatus as recited in claim 28, wherein the processor is further configured for queuing the segment alarm information and for selectively suppressing or forwarding an alarm by forwarding each alarm represented by segment alarm information in the queue, if no new alarm on the connection is reported during a pre-determined aging period.

35. The apparatus as recited in claim 28, wherein the processor is further configured for queuing the segment alarm information and for maintaining a plurality of pre-determined aging time values, wherein each of the plurality of pre-determined aging time values is associated with different segment alarm information that is stored in the queue.

* * * * *